United States Patent Office 2,790,763
Patented Apr. 30, 1957

2,790,763
TREATMENT OF DRILLING FLUID TO REDUCE WATER LOSS

David M. Updegraff, Dallas, Tex., assignor, by mesne assignments, to Socony Mobil Oil Company, Inc., a corporation of New York No Drawing. Application October 5, 1953,
Serial No. 384,355

2 Claims. (Cl. 252—8.5)

This invention relates to drilling fluids and relates more particularly to the treatment of drilling fluids to reduce the water loss thereof.

In the rotary drilling of oil and gas wells, a drilling fluid is employed for the purposes of lubricating the drill bit, carrying cuttings to the surface of the ground, and imposing a hydrostatic pressure to prevent flow of fluid from the drilled formations into the well bore hole. As the well bore is drilled through porous formations, difficulty is encountered as a result of loss of water from the drilling fluid into the formations by filtration through the sheath formed from the solid constituents of the drilling fluid on the wall of the well bore hole. It is highly desirable to maintain this loss of water by filtration, or water loss as it is commonly termed, as low as possible in order not only to prevent changes in the viscosity and other properties of the drilling fluid but also to prevent clogging of the formation where the formation is productive of oil or gas. Various agents have been added to drilling fluids to impart a low water loss to the drilling fluid and water-soluble salts of carboxymethyl cellulose have been found to be effective agents. The addition of a water loss reducing agent to a drilling fluid usually results in an undesirable increase in the viscosity and gel strength of the drilling fluid and, in common with other water loss reducing agents, water-soluble salts of carboxymethyl cellulose increase the viscosity and gel strength of drilling fluids to an undesired extent.

It is an object of this invention to reduce the water loss of drilling fluids. It is another object of this invention to reduce the effect of water-soluble salts of carboxymethyl cellulose in increasing the viscosity and gel strength of drilling fluids. It is another object of this invention to provide a method for treating water-soluble salts of carboxymethyl cellulose to improve their usefulness as water loss reducing agents in drilling fluids. Further objects of the invention will become apparent from the following description thereof.

In accordance with the invention, there is added to a drilling fluid to reduce the water loss thereof the reaction product obtained by subjecting a water-soluble salt of carboxymethyl cellulose having a degree of substitution less than one to the action of a microorganism capable of hydrolyzing such salt.

I have found that by subjecting a water-soluble salt of carboxymethyl cellulose having a degree of substitution less than one to the action of a microorganism capable of hydrolyzing such salt there is obtained a product which, weight for weight, has almost the same effect in reducing the water loss of drilling fluids as the original water-soluble salt of carboxymethyl cellulose but which has a comparatively slight effect with respect to increasing the viscosity of the drilling fluid, and no effect with respect to increasing the gel strength of the drilling fluid.

In subjecting the water-soluble salt of carboxymethyl cellulose to the action of a microorganism capable of hydrolyzing such salt, any water-soluble salt of carboxymethyl cellulose having a degree of substitution less than one and having the property of reducing water loss of a drilling fluid may be employed. For example, the sodium potassium, lithium, or ammonium salts of carboxymethyl cellulose may be employed. Preferably, the sodium salt is employed in view of its economy and availability. Additionally, carboxymethyl cellulose, the free acid, may also be employed even though the free acid is water-insoluble since, as will be pointed out in greater detail hereinafter, the action of the microorganism is carried out in a medium of sufficiently high pH that the free acid is converted to a water-soluble salt and the free acid will, therefore, dissolve in the medium in the form of a salt.

Carboxymethyl cellulose may be represented by the formula:

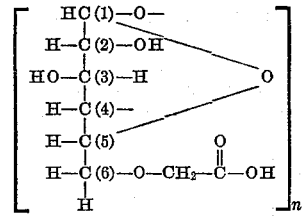

where $n$ is a whole number greater than one, and the carboxymethyl anhydroglucose units are connected together by oxygen bridges between carbon atom (1) of one unit and carbon atom (4) of another unit. A salt of carboxymethyl cellulose is carboxymethyl cellulose wherein the H at the end of the carboxymethyl group,

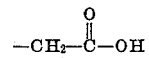

in one or more of the carboxymethyl and anhydroglucose units is replaced by a cation.

In any molecule or group of molecules of carboxymethyl cellulose, each anhydroglucose unit need not necessarily contain a carboxymethyl group although one or more anhydroglucose units may possibly contain up to three carboxymethyl groups, the additional carboxymethyl groups being substituted for the H's of the OH groups on carbon atoms (2) and (3). For the purposes of this invention, carboxymethyl cellulose having a degree of substitution less than one is defined as carboxymethyl cellulose wherein the number of anhydroglucose units exceeds the number of carboxymethyl groups. Carboxymethyl cellulose having a degree of substitution of 0.5 or 0.25, according to this definition is carboxymethyl cellulose wherein the ratio of anhydroglucose units to carboxymethyl groups is 0.5 or 0.25, respectively. Commercial grades of carboxymethyl cellulose have a degree of substitution ordinarily between 0.5 and 0.9.

I have found that the degree of substitution of the water-soluble salt of carboxymethyl cellulose subjected to the action of the microorganism affects the extent to which the reaction product changes the viscosity of the drilling fluid to which it is added, although the reduction in water loss of the drilling fluid is not changed to any appreciable extent. Thus, I have found that, with increasing degree of substitution toward a degree of substitution of one, the extent to which the reaction product obtained by the action of the microorganism increases the viscosity of the drilling fluid to which it is added becomes greater. Accordingly, in order to obtain the improved results of the invention, the water-soluble salt of carboxymethyl cellulose subjected to the action of the microorganism must have a degree of substitution less than one.

The microorganisms to whose action the water-soluble salts of carboxymethyl cellulose are subjected may be of various types. Preferably, the water-soluble salt of carboxymethyl cellulose is subjected to the action of what appears to be new or hitherto unisolated bacteria, and for which I employ the name *Achromobacter hydrolyticens*. These bacteria are obtainable from a wide variety of natural sources, such as straw, hay, lake water, ditch water, sea water, manure piles, etc. and have the following characteristics:

Rods: 0.3 to 0.6 by 1 to 5 microns, with rounded ends, occurring singly and in short chains. Motile with peritrichous flagella. Gram negative. Non-spore forming.

Gelatin stab: no liquefaction with most strains. Slow liquefaction observed with one strain.

Agar colonies: circular, entire, convex, smooth, soft, ivory color.

Nutrient agar slant: moderate, thin, filiform, ivory color, glistening.

Nutrient broth: slight turbidity, slight pellicle, slight to moderate sediment in six days.

Litmus milk: unchanged.

Potato: very slight to no growth, brown streak.

Indole not formed.

Nitrate not reduced.

Ammonia produced only in traces from peptone.

Hydrogen sulfide produced in small amounts from peptone (ZoBell-Feltham method).

Cellulose not digested.

Acid (no gas) from glucose, maltose, sucrose, mannitol; variable acid production from lactose, starch, and glycerol.

The microorganism is microaerophilic on initial isolation, but becomes capable of aerobic growth upon prolonged cultivation on sodium carboxymethyl cellulose under aerobic conditions.

A culture of *Achromobacter hydrolyticens* has been deposited with the American Type Culture Collection, 2029 M Street, N. W., Washington 6, D. C., and has been assigned their accession number 12299.

While it is preferred to subject the water-soluble salt of carboxymethyl cellulose to the action of *Achromobacter hydrolyticens*, the salt may also be subject to the action of various molds. Among these molds are *Stemphyllium sp.*, various strains of *Aspergillus ustus*, *Fusarium orthocerus*, *Fusarium scirpi*, *Fusarium chlamydosporum*, *Fusarium infectum*, various strains of *Fusarium sp.*, and various strains of *Alternaria tenuis*.

The action of the microorganisms on the water-soluble salt of carboxymethyl cellulose is carried out in aqueous solution. The concentration of salt in the aqueous solution may be as desired, but is limited primarily by the necessity of maintaining the viscosity of the solution at a sufficiently low value such that the solution may be readily pumped and stirred. Generally, the concentration of the salt may be between 0.5 and 5.0 percent by weight of the solution. The solution should also contain mineral elements required by the microorganisms for growth and multiplication and the following mineral elements, in the form of the ions and in the concentrations indicated will be satisfactory:

| Ion | Concentration—Parts per Million of Solution |
|---|---|
| Sulfate | 25 to 25,000 |
| Phosphate | 5 to 1,000 |
| Ammonium or Nitrate | 5 to 1,000 |
| Potassium | 5 to 1,000 |
| Calcium | 5 to 50 |
| Ferrous Iron | 5 to 50 |
| Magnesium | 5 to 50 |

The solution is inoculated with the culture of the microorganism and the pH of the solution is adjusted to a value between about six and eight, employing for this purpose a base whose cation, if substituted for the H in a carboxy group of the carboxymethyl cellulose, would form a water-soluble salt. As previously stated, carboxymethyl cellulose, the acid, may be subjected to the action of the microorganisms and the acid, admixed with an aqueous medium whose pH is maintained at a value between six and eight with a base whose cation, if substituted for the H in a carboxy group, would form a water-soluble salt of the acid, will dissolve in the medium in the form of the salt. Suitable bases for adjusting the pH of the solution include sodium hydroxide, potassium hydroxide, lithium hydroxide, and ammonium hydroxide, although sodium hydroxide is to be preferred because of its economy.

The mixture is incubated at a temperature which may be between about 25° C. and 37° C. and is preferably continually stirred during the incubation period. It is preferred, where *Achromobacter hydrolyticens* is employed, to control the gaseous atmosphere above the mixture during the incubation period with respect to maintaining the oxygen content at a value optimal for the culture used inasmuch as these bacteria can be microaerophilic and grow and multiply most rapidly where the free oxygen content of the medium is low. Control of the composition of the atmosphere can be accomplished by maintaining an atmosphere of nitrogen containing a desired quantity of oxygen above the mixture. In the case of molds, however, which are obligate aerobes, an adequate supply of oxygen is required during incubation. Incubation may be effected as long as desired up to cessation of the action of the microorganisms depending upon the extent to which it is desired that the viscosity increasing effect of the salt on drilling fluids be decreased, the greater the time of incubation the less the effect of the salt on the viscosity of the drilling fluid. Progress of the action of the microorganisms on the salt is marked by a decrease in the viscosity of the incubating medium and the progress of the reaction may be followed by measurement of the viscosity of the mixture. Cessation of the action of the microorganisms is marked by the viscosity of the mixture remaining at a constant value. Ordinarily, cessation of the action of the microorganisms is attained within two to ten days although shorter or longer periods of incubation may be required depending upon the incubation temperature, the concentration of the salt, and the number of microorganisms employed for inoculating the mixture.

While incubation may be effected as long as desired, it is preferred that incubation be continued until the action of the microorganisms has ceased in order that the viscosity increasing effect of the salt on drilling fluids be at a minimum. However, if it is desired to stop the reaction prior to completion, this may be effected by adding a germicide, such as formaldehyde or other conventional germicide that will not react with the salt, to the mixture. The product of the action of the microorganisms on the salt may be obtained from the mixture simply by evaporating the mixture to dryness. The product thus obtained is a dry powder resembling in appearance water-soluble salt of carboxymethyl cellulose. However, the product obtained by evaporation of this mixture to dryness will be contaminated with inorganic salts and residue from the microorganisms and, while such contamination is of inconsequential effect with respect to the use of the product in drilling fluids, a purer product may be obtained by filtering the solution to remove microorganism cells, dialyzing the resulting solution against distilled water or treating with ion exchange resins to remove inorganic salts, and then evaporating to dryness.

Drilling fluids ordinarily comprise a mixture of water and clay, all or part of the clay having thixotropic properties, and may contain weighting agents, such as barytes, and various additives for control of physical properties. They may also comprise an emulsion of water and oil and the emulsion drilling fluids may contain clay, weighting agents, and various additives. To reduce the water loss properties of a drilling fluid the reaction product is added thereto in accordance with the procedure heretofore employed in connection with the use of water-soluble salts of carboxymethyl cellulose for the same purpose and may be added to the same types of drilling fluid to which water-soluble salt of carboxymethyl cellulose has heretofore been added for the purpose of reducing water loss properties. However, since the increase in viscosity of the drilling fluid upon addition thereto of the reaction product is less than that encountered with water-soluble salt of carboxymethyl cellulose, a greater amount of the reaction product can be added per unit amount of drilling fluid than water-soluble salt of carboxymethyl cellulose. Thus, whereas conventionally, water-soluble salt of carboxymethyl cellulose is added to drilling fluids in an amount between about one and five pounds per barrel, the reaction product may be added in greater amounts, with consequent greater improvement in water loss properties depending upon the amount employed, but with a lesser increase in viscosity per unit amount added. Thus, the reaction product may be added to the drilling fluid in an amount greater than about five pounds per barrel such as about ten pounds per barrel or more although amounts between about one and five pounds per barrel will ordinarily be satisfactory.

The following example will be illustrative of the invention.

EXAMPLE

Sodium carboxymethyl cellulose having a degree of substitution of 0.55 was dissolved in water in a concentration of one percent by weight, the water containing the following minerals in approximately the concentration indicated expressed as parts per million: sodium carbonate—100, boric acid—30, magnesium sulfate—500, potassium phosphate—100, ammonium sulfate—1000, and ferric chloride—30. The solution was inoculated with a pure culture of carboxymethyl cellulose-hydrolyzing bacteria belonging to the species *Achromobacter hydrolyticens* and incubated for twelve days at a temperature of 30° C. At the end of this time, the water was removed from the mixture by evaporation and the dried, powdered reaction product thereby recovered.

A drilling fluid was prepared by admixing eight percent by weight of bentonitic clay with water and aging the mixture at 170° F. for sixty hours. Following aging, the water loss, plastic viscosity, yield value, and initial and ten-minute gel strengths of a first sample of this drilling fluid were measured. To a second sample of this drilling fluid were added two pounds per barrel of sodium carboxymethyl cellulose having a degree of substitution of 0.55. To a third sample of this fluid were added five pounds per barrel of the same sodium carboxymethyl cellulose. To a fourth sample of this fluid were added two pounds per barrel of the reaction product obtained by treatment of the sodium carboxymethyl cellulose obtained as described above, and to a fifth sample of the drilling fluid were added five pounds per barrel of the same reaction product. The water loss, plastic viscosity, yield value, and initial and ten-minute gel strengths of the latter four samples were then measured. The table gives the results obtained.

Table

|  | Sample No. | | | | |
| --- | --- | --- | --- | --- | --- |
|  | 1 | 2 | 3 | 4 | 5 |
| Water Loss—Cubic Centimeters | 33.6 | 9.5 | 7.7 | 10.5 | 9.1 |
| Plastic Viscosity—Centipoises | 5.36 | 42.4 | 104.7 | 11.9 | 8.5 |
| Yield Value—lbs./100 ft.² | 3.1 | 20.5 | 72.2 | 4.9 | 0 |
| Initial Gel Strength—Grams | 4 | 3 | 7 | 2 | 5 |
| 10-Minute Gel Strength—Grams | 7 | 11 | 58 | 3 | 1 |

It will be observed from the table that, whereas the sodium carboxymethyl cellulose appreciably reduced the water loss of the drilling fluid, it also appreciably increased the plastic viscosity, yield value, and ten-minute gel strength. The initial gel strength was reduced by the addition of two pounds per barrel of the sodium carboxymethyl cellulose but was increased by the addition of five pounds per barrel of the sodium carboxymethyl cellulose. However, it will be also observed from the table that, while the addition of two pounds and five pounds per barrel of the reaction product to the drilling fluid appreciably reduced the water loss of the drilling fluid, the increase in plastic viscosity was negligible compared to the increase resulting from additions of the same amount of sodium carboxymethyl cellulose. Further, while the addition of the reaction product in the amount of two pounds per barrel to the drilling fluid increased the yield value to some extent, the increase was negligible compared to the increase resulting from the addition of two pounds per barrel of sodium carboxymethyl cellulose, and the addition of five pounds per barrel of the reaction product actually reduced the yield value below the yield value of the untreated drilling fluid. The addition of the reaction product in the amounts of two and five pounds per barrel also reduced the gel strengths of the drilling fluid whereas a reduction in the initial gel strength only resulted with the addition of two pounds per barrel of sodium carboxymethyl cellulose, an increase occurring with addition of five pounds per barrel of sodium carboxymethyl cellulose. It will be additionally observed from the table that, whereas the reduction in water loss by addition of the reaction product was not as great as that obtained by addition of the same amounts of sodium carboxymethyl cellulose, the reduction in water loss was appreciable and an equivalent water loss could be obtained by the addition of greater amounts of the reaction product with only a negligible increase in viscosity compared to the increase in viscosity obtained by addition of equivalent amounts of sodium carboxymethyl cellulose.

Having thus described my invention, it will be understood that such description has been given by way of illustration and example and not by way of limitation, reference for the latter purpose being had to the appended claims.

I claim:

1. In the drilling of a well wherein there is circulated in said well a drilling fluid, the steps comprising adding to said drilling fluid in an amount to reduce the water loss thereof the reaction product obtained by subjecting a water-soluble salt of carboxymethyl cellulose having a degree of substitution less than one to the action of *Achromobacter hydrolyticens*, and circulating said drilling fluid in said well.

2. As a composition of matter, a drilling fluid containing as a water loss reducing agent the reaction product obtained by subjecting a water-soluble salt of carboxymethyl cellulose having a degree of substitution less than one to the action of *Achromobacter hydrolyticens*.

References Cited in the file of this patent

UNITED STATES PATENTS

| 2,360,327 | Bailey et al. | Oct. 17, 1944 |
| 2,425,768 | Wagner | Aug. 19, 1947 |
| 2,660,561 | Watkins | Nov. 24, 1953 |
| 2,679,478 | Fischer et al. | May 25, 1954 |